(12) United States Patent
Chang et al.

(10) Patent No.: US 11,809,923 B2
(45) Date of Patent: Nov. 7, 2023

(54) GOVERNING ACCESS TO THIRD-PARTY APPLICATION PROGRAMMING INTERFACES

(71) Applicant: Oracle International Corporation, Redwood Shores, CA (US)

(72) Inventors: Tuck Chang, Santa Clara, CA (US); Zhengming Zhang, Ontario (CA)

(73) Assignee: Oracle International Corporation, Redwood Shores, CA (US)

( * ) Notice: Subject to any disclaimer, the term of this patent is extended or adjusted under 35 U.S.C. 154(b) by 79 days.

(21) Appl. No.: 17/328,519

(22) Filed: May 24, 2021

(65) Prior Publication Data
US 2021/0279120 A1    Sep. 9, 2021

Related U.S. Application Data

(63) Continuation of application No. 16/427,465, filed on May 31, 2019, now Pat. No. 11,023,300, which is a
(Continued)

(51) Int. Cl.
*G06F 9/54* (2006.01)
*H04L 9/40* (2022.01)

(52) U.S. Cl.
CPC .......... *G06F 9/547* (2013.01); *H04L 63/0281* (2013.01); *H04L 63/20* (2013.01)

(58) Field of Classification Search
CPC . G06F 9/547; G06F 8/30; H04L 67/53; H04L 67/12; H04L 63/0281; H04L 63/20
See application file for complete search history.

(56) References Cited

U.S. PATENT DOCUMENTS 5,600,082 A   2/1997 Torimura
8,606,656 B1  12/2013 Franklin et al.
(Continued)

FOREIGN PATENT DOCUMENTS

CN   101809633 A   8/2010
CN   103563294 A   2/2014
(Continued)

OTHER PUBLICATIONS

Deng Jiayuan, "Research and Discussion of Influence of iQuery Plug-In on Web Application", Computer Knowledge and Technology, May 4, 2016, pp. 65-67.
(Continued)

*Primary Examiner* — Ashokkumar B Patel
*Assistant Examiner* — William B Jones
(74) *Attorney, Agent, or Firm* — Invoke

(57) ABSTRACT

Techniques for governing access to third-party application programming interfaces (API's) are disclosed. A proxy service exposes an API configured to receive requests, from user-facing services, to perform functions of backend services. The proxy service stores a usage policy that defines a criterion that is (a) different from any authorization criterion and (b) associated with using a function of a backend service. The proxy service receives a request to perform the function of the first backend service for a user-facing service and determines that the request does not satisfy the usage policy. Based on determining that the request does not satisfy the usage policy, the proxy service refrains from accessing the backend service to perform the function responsive to the request, and transmits an alert to the user-facing service indicating that the request does not satisfy the usage policy.

20 Claims, 8 Drawing Sheets

Related U.S. Application Data continuation-in-part of application No. 16/381,950, filed on Apr. 11, 2019, now Pat. No. 11,216,539, and a continuation-in-part of application No. 15/994,332, filed on May 31, 2018, now Pat. No. 10,902,152.

(60) Provisional application No. 62/748,105, filed on Oct. 19, 2018, provisional application No. 62/527,958, filed on Jun. 30, 2017.

(56) References Cited

U.S. PATENT DOCUMENTS

| | | |
|---|---|---|
| 2003/0145094 A1 | 7/2003 | Staamann et al. |
| 2011/0215159 A1 | 9/2011 | Jain |
| 2012/0209749 A1 | 8/2012 | Hammad et al. |
| 2012/0300960 A1 | 11/2012 | Mackay et al. |
| 2012/0324091 A9 | 12/2012 | Raleigh et al. |
| 2013/0305354 A1 | 11/2013 | King et al. |
| 2015/0007274 A1 | 1/2015 | Chang et al. |
| 2015/0052339 A1 | 2/2015 | Suzuki |
| 2015/0082372 A1 | 3/2015 | Kottahachchi et al. |
| 2015/0347164 A1 | 12/2015 | Li et al. |
| 2016/0036859 A1 | 2/2016 | Zaitsev |
| 2017/0012941 A1* | 1/2017 | Subbarayan ............ H04L 41/28 |
| 2017/0230312 A1 | 8/2017 | Barrett et al. |
| 2018/0077250 A1* | 3/2018 | Prasad ................... H04L 67/53 |
| 2018/0143750 A1 | 5/2018 | Ye |
| 2018/0341499 A1* | 11/2018 | Tse ......................... G06F 9/451 |
| 2019/0182213 A1* | 6/2019 | Saavedra ............ H04L 63/0236 |

FOREIGN PATENT DOCUMENTS

| | | |
|---|---|---|
| CN | 103765453 A | 4/2014 |
| JP | 08-006553 A | 1/1996 |

OTHER PUBLICATIONS

Mariani et al., "MASH: A tool for end-user plug-in composition", 34th International Conference on Software Engineering (ICSE), Jun. 28, 2012.

* cited by examiner

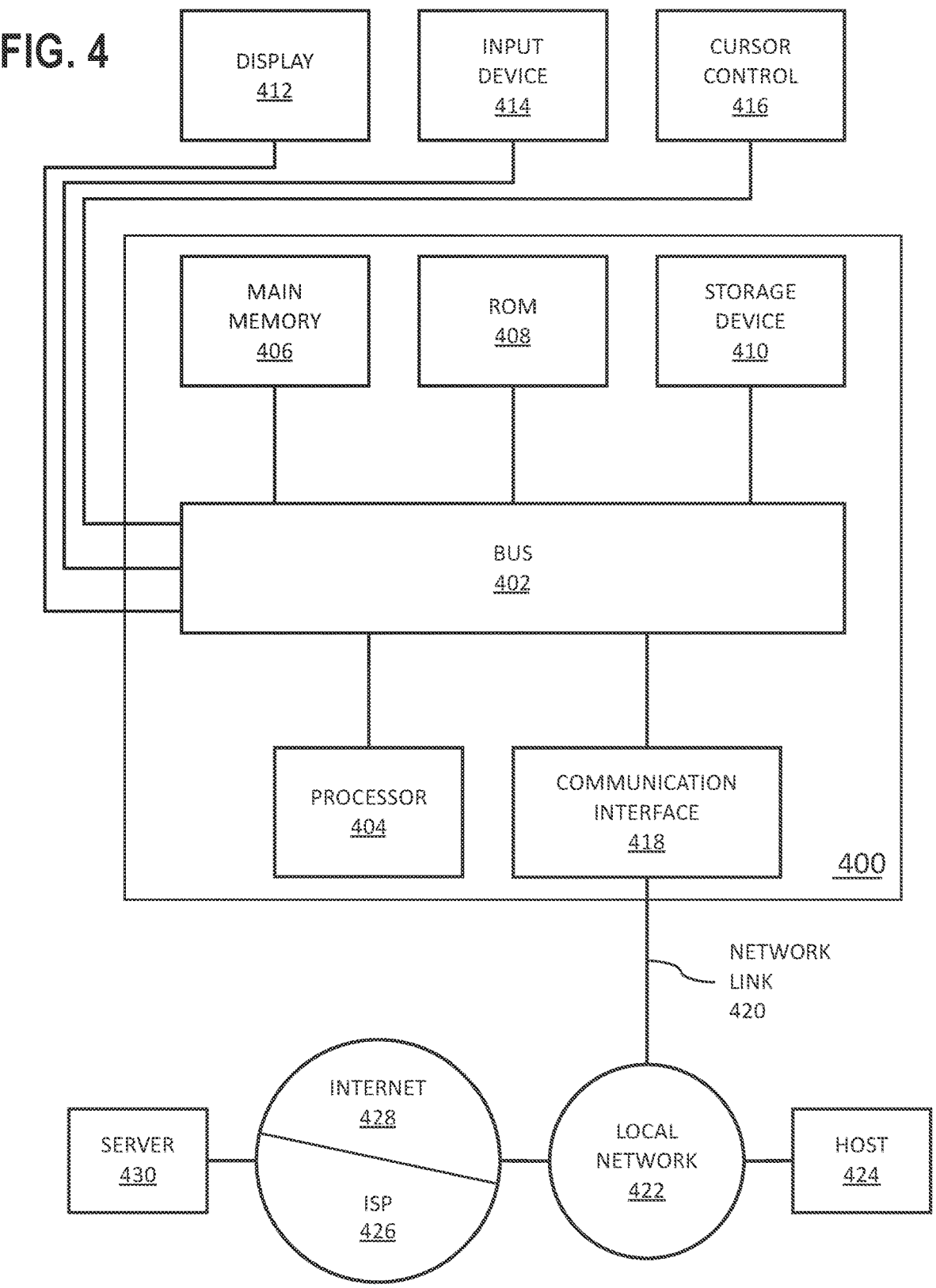

GOVERNING ACCESS TO THIRD-PARTY APPLICATION PROGRAMMING INTERFACES

INCORPORATION BY REFERENCE; DISCLAIMER

Each of the following applications are hereby incorporated by reference: application Ser. No. 16/427,465 filed May 31, 2019; application Ser. No. 16/381,950 filed Apr. 11, 2019; application No. 62/748,105 filed Oct. 19, 2018; application Ser. No. 15/994,332 filed May 31, 2018; application No. 62/527,958 filed Jun. 30, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to application programming interfaces (API's). In particular, the present disclosure relates to governing access to third-party API's.

BACKGROUND

In Internet technology, a user-facing service is a service that user interacts with directly. A user interacts with a user-facing service via a user agent, such as a web browser, a network-enabled application, and/or any other kind of software agent that communicates with a user-facing service at a user's direction. The user-facing service exposes content and/or other functionality to the user, via the user agent. A backend service is a service that supplies additional content and/or functionality to a user-facing service, beyond what the user-facing service is configured to supply independently. In one example, a user-facing image publishing service provides a website that allows a user, via a web browser, to create a personalized photo book. To accept payment for the calendar, the image publishing service integrates with a backend payment processing service. In this example, the user interacts with the payment processing service during a checkout process, when ordering a photo book from the image publishing service. Many different kinds of user-facing services and backend services exist.

To integrate with a backend service, each user-facing service that seeks to access a particular backend service's function(s) directly is required to implement some form of code that interacts with the backend service's API(s), which may include code to submit requests, receive data responsive to requests, handle error conditions, etc. If a backend service's API changes, each user-facing service that accesses that API directly is required to make corresponding code changes. In addition, certain restrictions may apply to using a backend service's API. Access to certain functions may be prohibited for certain entities and/or under certain conditions. Alternatively or additionally, accessing a backend service function may incur financial costs (e.g., overage charges) under certain conditions. Each user-facing service that accesses a backend service's API is subject to the corresponding restriction(s).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
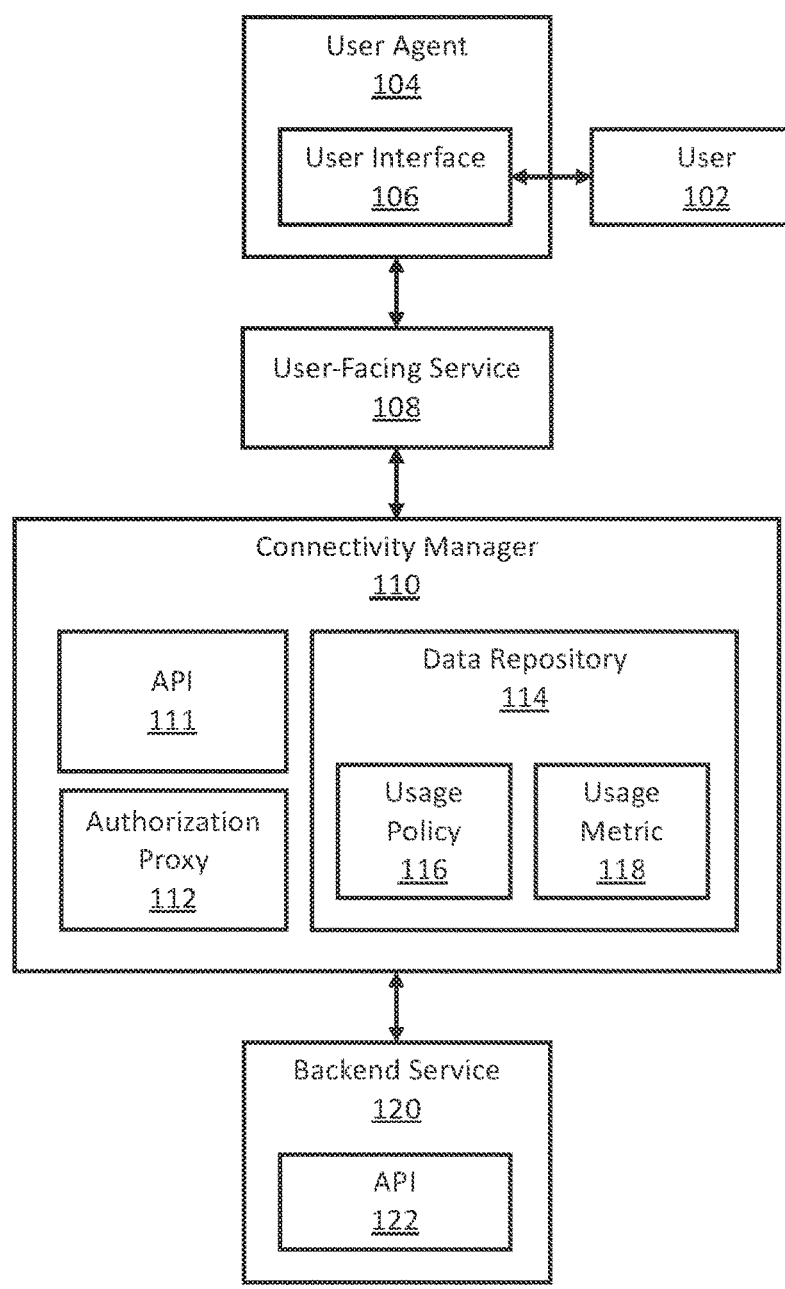
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. GOVERNING ACCESS TO THIRD-PARTY API'S
4. ILLUSTRATIVE EXAMPLE
5. MISCELLANEOUS; EXTENSIONS
6. HARDWARE OVERVIEW
7. COMPUTER NETWORKS AND CLOUD NETWORKS

1. General Overview

One or more embodiments include techniques for governing access to third-party application programming interfaces (API's). A proxy service exposes an API configured to receive requests, from user-facing services, to perform functions of backend services. The proxy service stores a usage policy that defines a criterion that is (a) different from any authorization criterion and (b) associated with using a function of a backend service. The proxy service receives a request to perform the function of the first backend service for a user-facing service and determines that the request does not satisfy the usage policy. Based on determining that the request does not satisfy the usage policy, the proxy service refrains from accessing the backend service to perform the function responsive to the request, and transmits an alert to the user-facing service indicating that the request does not satisfy the usage policy.

In an embodiment, a proxy service that governs access to third-party API's enforces legal and/or organizational connectivity policies. Alternatively or additionally, a proxy service may include a data queue and/or other traffic smoothing functionality to help a requesting service comply with a data transfer policy or restriction of a requested service. Alternatively or additionally, using a proxy service to govern access to third-party API's delivers economies of scale, in comparison to implementations of connection protocols that are implemented separately for different services. The number and/or scale of computer systems needed to implement and access connection protocols separately may exceed the number and/or scale of computer systems needed to implement and access a proxy service. Alternatively or additionally, the proxy service may help avoid duplication of effort, saving time and/or money associated with implementing the same connection protocols separately across multiple different services. Different entities that access the same service(s) are not required to separately model and implement the API's that would be needed to communicate directly with the desired service(s). Alternatively or additionally, using a proxy service to govern access to third-party API's may help protect entities that provide services from disruptions due to changes in other services. A proxy service may be able to implement the change(s) needed to communicate with a modified backend service API, without requiring any changes in the user-facing service(s) implementation(s). Alternatively or additionally, in the event of an unexpected connection failure, a proxy service may retry the connection without initially transmitting any error message to the service(s) requesting the connection. Services that use the proxy service to access multiple different services may only need to implement handlers for the proxy service's predefined error message format(s), without needing to implement separate error handlers for each different service being accessed.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a user 102, user agent 104, user-facing service 108, connectivity manager 110, backend service 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the system 100 includes a connectivity manager 110. The connectivity manager 110 is configured to manage connectivity between independently operating services (e.g., one or more user-facing services 108 and/or one or more backend services 124), including acting as a proxy service for operations of different services. The connectivity manager 110 centralizes the implementation of connection protocols used by different services, such that the services themselves are not responsible for the implementation details. The connectivity manager 110 may expose an application programming interface (API) 111 through which the different services transmit connectivity requests and/or supply data to be transmitted from one service to another. The API 111 may be a Representational State Transfer (REST) API, a Simple Object Access Protocol (SOAP) API, an Extensible Markup Language Remote Procedure Call (XML-RPC) API, a JavaScript Object Notation Remote Procedure Call (JSON-RPC) API, or any other kind of API or combination thereof.

In an embodiment, the connectivity manager is configured to govern connections to and/or between the API's of plug-in applications used to execute one or more plug-in application recipes (PIAR's). A PIAR is a set that includes a triggering event (referred to herein as a "trigger" or "trigger condition") and an action, arranged logically as an if-then formulation. The "if" portion of the formulation corresponds to a PIAR trigger condition. The "then" portion of the formulation is conditioned on the "if" portion being satisfied, and corresponds to a triggerable action. A plug-in application may supply the action. A plug-in application that supplies an action may be the same as, or different than, a plug-in application that supplies data against which a trigger condition is evaluated.

In an embodiment, the connectivity manager 110 includes, is a part of, or otherwise communicates with a PIAR management application (not shown). The PIAR management application presents an interface that allows a user to define PIAR's. A PIAR definition indicates one or more actions to be executed by the PIAR management application. A PIAR definition further indicates a trigger, based on data supplied by one or more plug-in applications. When a PIAR management application detects that a trigger condition is satisfied, the PIAR executes the action(s) corresponding to the detected trigger. In an embodiment, the PIAR management application includes features described in U.S. patent application Ser. No. 15/994,346, titled "Managing a Plug-In Application via an Interface," filed May 31, 2018, incorporated herein by reference.

A PIAR management application may be used for many purposes. For example, a PIAR management application may be used to automate repetitive tasks. Examples of PIARs include, but are not limited to: (a) responsive to detecting that a user's car is in the user's driveway (trigger), opening the user's garage door (action); (b) responsive to determining that a user's walked steps have not reached a particular goal by 5 p.m. (trigger), transmitting a notification to the user (action); (c) responsive to detecting a new sales contact in an address book or email (trigger), creating a new folder to store information about the sales contact (action).

The term "plug-in application" refers to the fact that applications that supply action(s) and/or data against which trigger conditions are evaluated logically 'plug in' to a PIAR management application and thus become part of a PIAR's logic. For example, a PIAR management application may be organized according to a micro-services architecture, such that several independent services are plugged into the PIAR management application. A plugged-in service may provide monitoring service(s) specific to a particular application, to support trigger(s) for the particular application. Alternatively or in addition, a plugged-in service may provide action service(s) specific to a particular application, to support executing action(s) for that particular application.

In an embodiment, a user-facing service 108 is a plug-in application that supplies an action and/or supplies data against which a PIAR trigger condition is evaluated. Alternatively or additionally, a backend service 120 may be a plug-in application that supplies an action and/or supplies data against which a PIAR trigger condition is evaluated.

In an embodiment, a connectivity manager 110 is configured to govern access to third-party API's. As used herein, third-party API's are API's exposed by one or more services that are accessible via the connectivity manager 110, each of which is considered a third party relative to the connectivity manager 110 and requesting service(s). The connectivity manager 110 may govern access to third-party API's in many different ways, or combinations thereof, as described herein. In general, governing access to a third-party API may refer to enforcing a usage policy associated with the third-party API, enforcing a service-level agreement (SLA) associated with the third-party API, remediating disruptions in access to the third-party API, and/or taking any other measure or combination thereof to govern access to the third-party API in a manner that may not be explicitly exposed and/or supported by the third-party API itself and/or any other API exposed by the requested service. Examples of operations for governing access to third-party API's are described below.

In an embodiment, the connectivity manager API 111 is standardized across multiple services, allowing for different configurations of service-to service connections using the same set of standardized API call(s). One service may connect to another service via the standardized API, rather than directly implementing the underlying protocol(s) needed to connect to that service. Alternatively or additionally, the API 111 may be configured to receive discovery requests and respond to discovery requests with information (which may be referred to as a discoverable "catalog") describing one or more of the different service(s) supported by the connectivity manager 110.

In an embodiment, discoverable information about the service(s) supported by the connectivity manager 110 may include branding data (e.g., logos, descriptions, and/or other branding data) associated with the supported service(s). The connectivity manager 110 may serve as a centralized access point for the branding data, helping to ensure that branding data presented to users of the requesting service(s) is consistent across connections and/or adheres to branding guidelines and/or preferences. When branding data associated with a service changes, a corresponding change may be made at the connectivity manager 110, which may avoid duplication of effort for multiple services accessing the branding data via the connectivity manager 110.

In an embodiment, a connectivity manager 110 delivers economies of scale, in comparison to implementations of connection protocols that are implemented separately for different services. The number and/or scale of computer systems needed to implement and access connection protocols separately may exceed the number and/or scale of computer systems needed to implement and access a connectivity manager 110. Alternatively or additionally, the connectivity manager 110 may help avoid duplication of effort, saving time and/or money associated with implementing the same connection protocols separately across multiple different services. Different entities that access the same service(s) are not required to separately model and implement the API's that would be needed to communicate directly with the desired service(s).

In an embodiment, a connectivity manager 110 helps protect entities that provide the different services from disruptions due to changes in other services. For example, if service A communicates directly with service B and service B's API changes (e.g., by changing the existing API and/or exposing an entirely new API), service A must be aware of the API change and implement corresponding changes to communicate with service B's modified API, to avoid disruption in communication between service A and service B. These changes must be repeated for every service that communicates directly with service B via that API. However, if service A communicates with service B via a connectivity manager 110, then the connectivity manager 110 may be able to implement the change(s) needed to communicate with service B's modified API, without requiring any changes in service A's implementation. Service A continues to use the same connectivity manager API 111 exposed by the connectivity manager 110. The change implemented at the connectivity manager 110 may apply to any number of service-to-service connection paths that use the connectivity manager API 111, avoiding the need to replicate the change separately for each of those paths.

Alternatively or additionally, in the event of an unexpected connection failure, a connectivity manager 110 may retry the connection without initially transmitting any error message to the service(s) requesting the connection. The connectivity manager 110 may expose the failure to the requesting service(s) only if one or more retries fail, for example according to a policy that defines a maximum number of retries. Error messages presented by the connectivity manager 110 may conform to a predetermined error message format that is consistent across multiple connections and/or connection types. Services that use the connectivity manager 110 to access multiple different services may only need to implement handlers for the connectivity manager 110's predefined error message format(s), without needing to implement separate error handlers for each different service being accessed.

In an embodiment, a connectivity manager 110 enforces legal and/or organizational connectivity policies. For example, Twitter prohibits sentiment analysis by government entities. If entities communicate with Twitter via a connectivity manager 110, the connectivity manager 110 may enforce the policy to ensure that government entities do not access sentiment analysis features exposed by Twitter's API. As another example, an organization may prohibit the use of a competitor's service(s). If all services within the organization are required to implement connections with other services via a connectivity manager 110, then the connectivity manager 110 may enforce the restriction against communicating with the competing service(s). A connectivity manager 110 may disable access to a connection that was previously enabled, based on a policy and/or the connection becoming otherwise unavailable. A connectivity manager 115 may help enforce many different kinds of legal and/or organizational policies. Entities may configure their own policies, according to a service level agreement (SLA) with the connectivity manager 110. For example, an SLA may implement data caps to avoid costly and/or performance-degrading data transfer overages. Alternatively or additionally, a connectivity manager 110 may include a data queue and/or other traffic smoothing functionality to help a requesting service comply with a data transfer policy or restriction of a requested service. For example, the connectivity manager 110 may enqueue and smooth data traffic to help ensure no more than X bytes transferred or Y access attempts in a given timeframe, where transferring more than X bytes or making more than Y access attempts in that timeframe may result in the requesting service being blacklisted, disabled, throttled, and/or incurring overage fees.

In an embodiment, a connectivity manager 110 is configured to govern access to third-party API's that are used in executing PIAR's, described above. Governing access to one or more third-party API's that are used in executing a PIAR may be referred to as governing the PIAR. Governing a PIAR may involve restricting a PIAR. In general, restricting a PIAR restricts one or more users' access to functionality that would otherwise be available to the user(s) in the absence of the restriction. Based on one or more restriction criteria, a PIAR restriction may block the creation, use, or activation of a PIAR. For example, a PIAR restriction may block the creation, use, or activation of a PIAR that uses a particular plug-in application and/or a function thereof, where using the particular plug-in application and/or function is prohibited within a particular organization and/or for one or more particular user(s) or group(s) of users. If, when a PIAR restriction is created, an already active PIAR violates the PIAR restriction, the connectivity manager 110 may terminate execution of that PIAR and/or apply the restriction to ongoing execution of that PIAR. For example, the connectivity manager 110 may mask, block, and/or otherwise restrict data that flows through a PIAR, if a PIAR restriction governs the type(s) of data transmission permitted between plug-in applications. Examples of restricting PIAR's are described in U.S. patent application Ser. No. 15/994,332, filed May 31, 2018, incorporated by reference above. In an embodiment, a connectivity manager 110 stores a PIAR restriction as a usage policy 116, described in further detail below.

In an embodiment, a connectivity manager 110 supplies administrative features that track how the connectivity manager 110 is being used. The connectivity manager 110 may track who (e.g., which user accounts and/or other organizational entities) is/are connecting to services, how much data different entities are transferring to, from, and/or between services, what types of data (e.g., multimedia, social media, email messages, etc.) the entities are transferring, etc. The connectivity manager 110 may monitor usage to detect prohibited and/or abnormal usage, such as a spike in transmission typically associated with unauthorized use (e.g., a distributed denial of service (DDoS) attack, a spike in BitTorrent traffic that may be associated with data piracy, or any other kind of unauthorized use characterized by a spike in data traffic). The connectivity manager 110 may include a messaging service that notifies a user (e.g., a user who requests access to a service and/or a system administrator) of an actual or potential violation of a policy. The user may have the option to decide whether to allow the connection to proceed in violation of the policy. Alternatively or additionally, the connectivity manager 110 may log usage. The connectivity manager 110 may present log data, describing usage of the connectivity manager 110, in a user interface that supplies log review and/or usage auditing functions.

In an embodiment, a user 102 is an entity (e.g., an individual, a corporate entity, or a service implemented in hardware and/or software) that interacts with a user-facing service 108. A user 102 may or may not be a human user. A user 102 may represent the access grants and restraints associated with a particular account of an application, as distinct from other accounts of the application that have different access grants and restraints. A user agent 104 may be a web browser, network-enabled application, and/or any other kind of software agent that communicates with a user-facing service 108 at a user 102's direction and/or on a user 102's behalf.

In an embodiment, a user agent 104 presents a user interface 106, rendered based on instructions supplied by the user-facing service 108, to a user 102. The user interface 106 refers to hardware and/or software configured to facilitate communications between a user 102 and a user-facing service 108. User interface 106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, data end time selectors, command lines, sliders, pages, and forms.

In an embodiment, different components of the user interface 106 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 106 is specified in one or more other languages, such as Java, C, or C++.

In an embodiment, a user-facing service 108 is a service that a user 102 interacts with directly or indirectly (e.g., by supplying user input to the user agent 104). A user-facing service 108 may be a software-as-a-service (SaaS) application. Examples of user-facing services 108 include, but are not limited to: cloud-based productivity tools (e.g., word processors, spreadsheets, email presentations, calendars, task managers, etc.), document storage (e.g., cloud-based document synchronization and/or backup tools), customer relationship management (CRM) tools, audio- and/or video-conferencing, storefronts, social media, games, or any other kind of service that is accessible via a user agent 104, or combination thereof.

In an embodiment a user-facing service 108 includes a web server that generates instructions (e.g., HTML) that the user agent 104 uses to render a user interface 106. The web server may include server-side instructions that, when executed, cause the user-facing service 108 to communicate with a connectivity manager API 111. Alternatively or additionally, a user-facing service 108 may include a discovery engine that is configured to transmit discovery requests to the connectivity manager 110. Responsive to discovery requests, the connectivity manager 110 returns information about information about the service(s) that are supported by the connectivity manager 110 and accessible via the connectivity manager API 111.

In an embodiment, a connectivity manager 110 includes an authorization proxy 112. An authorization proxy 112 refers to hardware and/or software configured to perform operations for brokering authorization between a user 102, a user-facing service 108, and a backend service 120. An authorization proxy platform is described in U.S. patent application Ser. No. 16/381,950, filed Apr. 11, 2019, incorporated by reference above.

In an embodiment, a connectivity manager 110 stores one or more usage policies 116. The connectivity manager 110 may store a usage policy 116 in a data repository 114. A usage policy defines one or more criteria for using one or more functions of a backend service 120 that are accessible via a backend service API 122. In general, a usage policy 116 defines one or more codified rules that the connectivity manager 110 uses to govern access to the backend service API 122. A usage policy 116 may be user-configurable as described herein. Alternatively or additionally, a usage policy 116 may apply to one entity using the connectivity manager 110 but not another entity using the connectivity manager 110. For example, a usage policy 116 may apply to one user but not another user, one tenant but not another tenant, one user group but not another user group, one user role but not another user role, one user account but not another user account, etc.

In an embodiment, a connectivity manager 110 stores one or more usage metrics 118. The connectivity manager 110 may store a usage metric 118 in a data repository 114. A usage metric 118 is a metric that the connectivity manager 110 uses to track usage of a backend service API 122. In general, a usage metric 118 is a metric that the connectivity manager 110 uses to determine whether a usage policy 116 is satisfied. For example, if a usage policy 116 defines a data transfer cap within a particular time period, the usage metric 118 may be a running total of data transfers within the corresponding time period. As another example, if a usage policy 116 defines a maximum number of requests within a particular time period, the usage metric 118 may be a running total of requests within the corresponding time period. As another example, if a usage policy 116 defines a cap on data transfer fees, the usage metric 118 may indicate total fees incurred to date. Alternatively or additionally, a usage metric 118 may include metadata associated with uses of a backend service API 122, such as identities of users that access the API 122, dates and/or times of access, records of data and/or data types transferred, and/or any other kind of metadata or combination thereof. A connectivity manager 110 may store many different usage metrics 118, for use with many different usage policies 116.

In an embodiment, a connectivity manager 110 includes a data repository 114. A data repository 114 may be any type of storage unit and/or device (e.g., a file system, database, collection of tables, or any other storage mechanism) for storing data. Further, a data repository 114 may include multiple different storage units and/or devices. The multiple different storage units and/or devices may or may not be of the same type or located at the same physical site. Further, a data repository 114 may be implemented or may execute on the same computing system as one or more other components of the system 100. Alternatively or additionally, a data repository 114 may be implemented or executed on a computing system separate from one or more other components of the system 100. A data repository 114 may be communicatively coupled to one or more other components of the system 100 via a direct connection or via a network. Information describing usage policies 116 and/or usage metrics 118 may be implemented across any of components within the system 100. However, this information is illustrated within the data repository 114 for purposes of clarity and explanation.

In an embodiment, a backend service 120 is a service that exposes an API 122 for which a connectivity manager 110 acts as a proxy. The connectivity manager 110 implements the functionality necessary to access the backend service API 122. The connectivity manager 110 may access the backend service API 122 to register the connectivity manager 110 as a client of the backend service 120, submit an authorization request, submit a request to perform one or more functions of the backend service 120, and/or submit any other kind of request for operations that are exposed by the backend service 120 via the backend service API 122. The connectivity manager 110 provides access to some or all of the backend service 120's functionality to other services via its own API 111. In addition, the connectivity manager 110 may govern access to the backend service API 122 as described herein. A connectivity manager 110 may support multiple backend services 120 and/or multiple backend service API's 122.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Governing Access to Third-Party API's

Figure 2A:
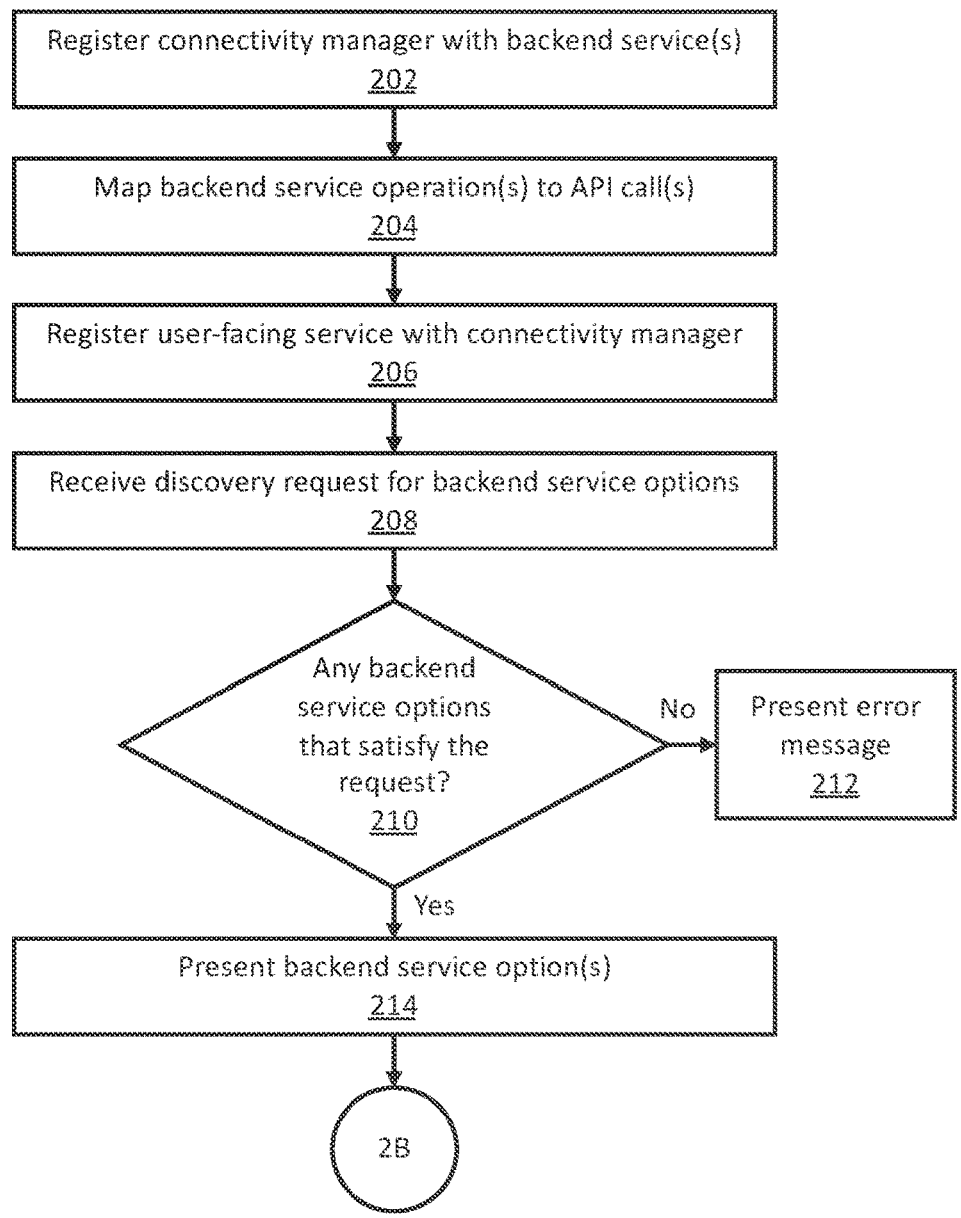
FIGS. 2A-2C illustrate a set of operations for governing access to third-party API's in accordance with one or more embodiments.
Figure 2B:
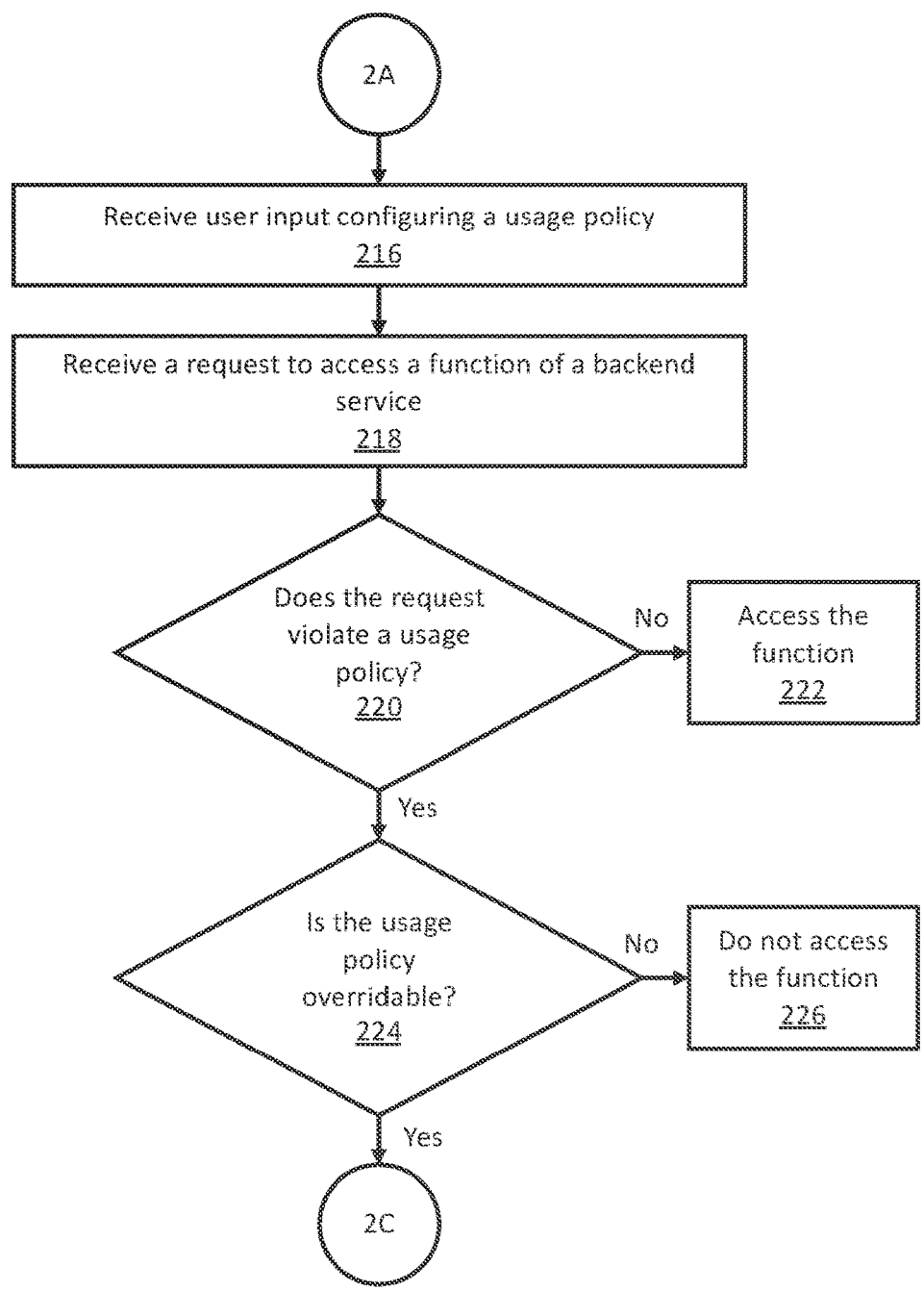
Figure 2C:
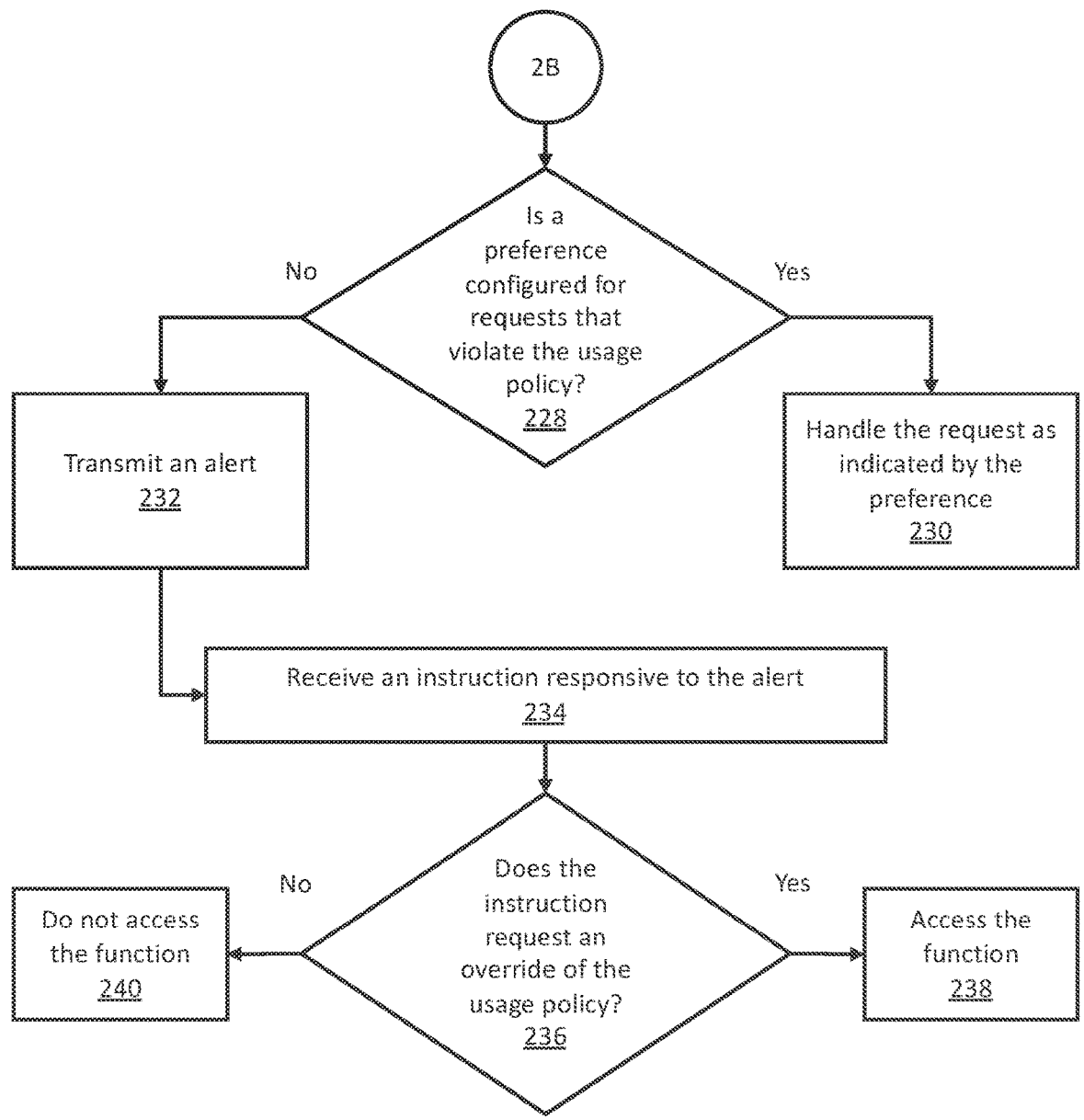

FIG. 2 illustrates an example set of operations for governing access to third-party API's in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a connectivity manager is registered with one or more backend services (Operation 202). Registering the connectivity manager with the backend service authorizes the connectivity manager, as a client of the backend service, to access one or more functions exposed by the backend service. To authorize as a client of the backend service, the connectivity manager may submit a registration request to the backend service. Responsive to the registration request, the authorization server may supply credentials that are uniquely associated with the connectivity manager. The credentials may include a unique client identifier, a client secret, and/or any other kind of credentials or combination thereof. The connectivity manager may supply the credentials when submitting requests to the backend service. In an embodiment, registering as a client of the backend service authorizes the connectivity manager to perform operations, using the backend service, that a user-facing service would otherwise be required to implement separately. The user-facing service may not be required to register as a client of the backend service.

In an embodiment, the connectivity manager maps one or more backend service operations (i.e., operations that are accessible via a backend service's API) to API calls exposed by the connectivity manager (Operation 204). The operation(s) may correspond to one or more functions of the backend service. Mapping a backend service operation to an API call generates a record (e.g., a database field, XML tag, file, and/or another kind of record or combination thereof) indicating that the backend service operation is an option available for that API call. For example, the connectivity manager may map one or more operations of a backend service that exposes payment processing options to an API call for requesting payment processing operations. The connectivity manager may map operations of multiple backend services to the same API call. The multiple mappings may correspond to a catalog of backend service options available for that API call.

In an embodiment, a user-facing service is registered with the connectivity manager (Operation 206). Registering a user-facing service with the connectivity manager authorizes the user-facing service, as a client of the connectivity manager, to access operations of the connectivity manager. To authorize as a client of the connectivity manager, the user-facing service may submit a registration request to the connectivity manager. Responsive to the registration request, the connectivity manager may supply credentials that are uniquely associated with the user-facing service.

The credentials may include a unique client identifier, a client secret, and/or any other kind of credentials or combination thereof. The user-facing service may supply the credentials when submitting requests to the connectivity manager. In an embodiment, registering as a client of the connectivity manager allows the user-facing service to access content and/or other functionality of a backend service, without the user-facing service being required to register as a client of the backend service. Alternatively or additionally, registering a client of the connectivity manager may allow the user-facing service to access multiple backend services supported by the connectivity manager. In an embodiment, as a client of the connectivity manager, the user-facing service is not required to implement instructions for communicating directly with the backend service.

In an embodiment, the connectivity manager receives a discovery request for backend service options, from a user-facing service (Operation 208). The connectivity manager may support multiple backend services (e.g., multiple backend service options for a particular operation, such as payment processing). The connectivity manager may receive a request to discover the backend service options. In an embodiment, the connectivity manager determines whether the connectivity manager supports any backend service options that satisfy the request (Operation 210). For example, if a discovery request is for all supported backend services that provide payment processing, the connectivity manager may determine whether the connectivity manager is registered with any backend services that provide payment processing. If the connectivity manager does not support any backend service options that satisfy the request, then the connectivity manager may present an error message responsive to the discovery request (Operation 212).

In an embodiment, if the connectivity manager supports at least one backend service that satisfies the request, the connectivity manager presents information about the supported backend service(s) responsive to the request (Operation 214). The connectivity manager may supply information about the backend service operations in XML, JSON, or any other kind of format or combination thereof. In an embodiment, the information includes one or more uniform resource locators (URL's) that correspond, respectively, to requests for interfaces that allow a user to supply credentials for whichever backend service option the user selects.

In an embodiment, a usage policy is configurable. The connectivity manager may receive user input configuring a usage policy (Operation 216). The connectivity manager may support one or more preferences that define the usage policy itself, i.e., the backend service operation(s) to be governed and one or more criteria that determine whether a given request to access the governed operation(s) violates the usage policy. Alternatively or additionally, the connectivity manager may support one or more preferences that define whether to enforce the usage policy and/or one or more specific conditions under which the connectivity manager should enforce the usage policy. Alternatively or additionally, a usage policy may be overridable, i.e., allow for some or all requests to proceed in violation of the usage policy. The connectivity manager may support one or more preferences that define (a) whether a usage policy is overridable, (b) whether an override is enabled that applies to all requests or a particular subset thereof, (c) whether any users are authorized to override the usage policy on a case-by-case basis, (d) which user(s) is/are authorized to override the usage policy on a case-by-case basis, (e) one or more mechanisms for alerting the user(s) authorized to override the usage policy on a case-by-case basis, and/or any other kind of override-related preference or combination thereof. The scope of the usage policy configuration (i.e., configurable definition(s) and/or preference(s) associated with a usage policy) may be confined to a particular user (e.g., a particular user account used to execute a particular PIAR), a business unit, an organization, all uses of the governed backend service by any user and/or organization, and/or any other scope or combination thereof.

In an embodiment, the connectivity manager receives a request to access a function of a backend service (Operation 218). The function may correspond to authorizing a user account to access the backend service, and/or any other function of the backend service or combination thereof. Responsive to the request, the connectivity manager determines whether the request violates a usage policy (Operation 220). The usage policy may have already been violated by a prior request. Alternatively, the usage policy may not have already been violated, but would be violated if the connectivity manager were allowed to access the requested function of the backend service. If multiple usage policies are configured for the requested function, the connectivity manager may determine whether the request violates any of the configured usage policies. A condition that determines that a request violates a usage policy (e.g., reaching a data cap) may be temporary, such that a subsequent request, made after the condition has been alleviated, does not violate the usage policy. In addition, a request by one entity may violate a usage policy, while a similar request by another entity may not violate the same usage policy. For example, given two user-facing services attempting to transfer the same amount of data, one of the user-facing services may have reached a data cap while the other user-facing service has not reached the data cap. Alternatively or additionally, a different request from the same entity (e.g., a request to access a different function, a request to transfer a different amount and/or type of data, and or a request that differs in some other way) may not violate the usage policy.

In an embodiment, if the request does not violate any usage policy, the connectivity manager accesses the function of the backend service (Operation 222). To access the function of the backend service, the connectivity manager may invoke a backend service API, to request that the backend service execute the operation(s) corresponding to the request. Responsive to the connectivity manager accessing the function, the backend service may supply data that is responsive to the request.

In an embodiment, if the request does violate a usage policy, the connectivity manager determines whether the usage policy is overridable (Operation 224). For example, a usage policy may be overridable via a preference that applies to all requests, and/or via user input on a case-by-case basis as described herein.

In an embodiment, if the usage policy is not overridable, then the connectivity manager does not access the function of the backend service (Operation 226). The connectivity manager may ignore the request without taking any further action with respect to the request. Alternatively, the connectivity manager may generate an error message and transmit the error message to the user-facing service responsive to the request, indicating that the request violates the usage policy and is not permitted. The error message may include any other kind of information associated with the request and/or the usage policy. The connectivity manager may transmit the error message to a user whose account is associated with the request, an administrator of the connectivity manager, and/or any other user to whom the error message may be relevant. Alternatively or additionally, the connectivity manager may store error messages (e.g. in a log file) for subsequent reporting and/or diagnostic purposes.

In an embodiment if a usage policy is overridable, then the connectivity manager determines whether a preference is configured for requests that violate the usage policy (Operation 228). If a preference is configured, then the connectivity manager may handle the request as indicated by the preference (Operation 230). If the preference indicates that the usage policy should be overridden for all requests, based on one or more requests characteristics that match the current request, for a particular time period, and/or based on another criterion or combination thereof, then the connectivity manager accesses the function of the backend service. Alternatively, if the preference indicates that the usage policy should not be overridden for any requests, based on one or request characteristics that match the current request, for a particular time period, and/or based on another criterion or combination thereof, then the connectivity manager does not access the function of the backend service.

In an embodiment, if no preference is configured for requests that violate the usage policy, then the connectivity manager may transmit an alert (Operation 232). The connectivity manager may transmit the alert to a user-facing service that originated the request. For example, if the request is associated with a PIAR, the connectivity manager may transmit the alert to an administrator of the PIAR management application. The alert indicates that the request violates the usage policy. Additionally, the alert may request that the user supply an instruction as to whether to override the usage policy in this particular instance.

In an embodiment, the connectivity manager receives an instruction responsive to the alert (Operation 234). The connectivity manager may determine whether the instruction requests an override of the usage policy (Operation 236). The instruction may request a single override, for the particular request in question, or an ongoing override for this request and future requests (i.e., all requests, based on one or more request characteristics indicated by the instruction, for a particular time period, and/or based on another criterion or combination thereof). If the instruction requests an override of the usage policy, then the connectivity manager accesses the function of the backend service (Operation 238), even though doing so violates the usage policy. If the instruction does not request an override of the usage policy, or explicitly indicates not to override the usage policy, then the connectivity manager does not access the function of the backend service (Operation 240).

4. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
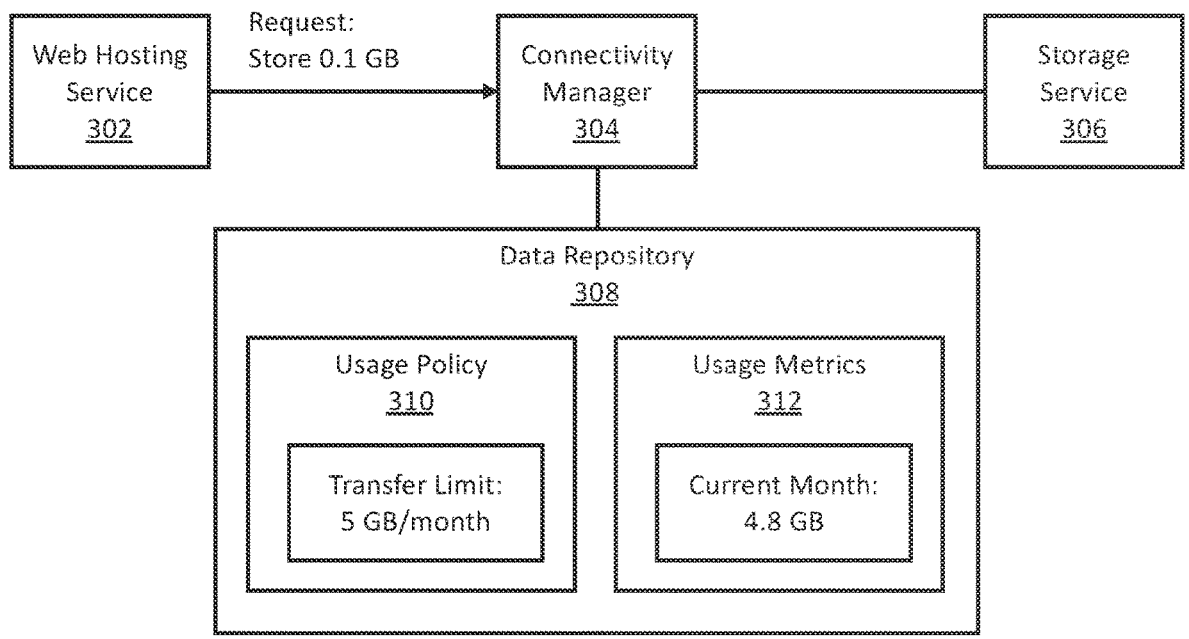
FIGS. 3A-3F illustrate an example in accordance with one or more embodiments.

FIGS. 3A-3F illustrate an example in accordance with an embodiment. As illustrated in FIG. 3A, a connectivity manager 304 is configured to act as a proxy for functions of a storage service 306. A web hosting service 302 is configured to access functions of the storage service 306 via the connectivity manager 304. The connectivity manager 304 is communicatively coupled with a data repository 308 that stores a usage policy 310 and usage metrics 312. In this example, the usage policy 310 corresponds to a transfer limit of five (5) gigabytes (GB) per month. The usage metrics 312 indicate that for the current month, 4.8 GB have already been transferred between the web hosting service 302 and the storage service 306. In FIG. 3A, the web hosting service 302 transmits a request to the connectivity manager 304's API, requesting to store 0.1 GB of data at the storage service 306.

Figure 3B:
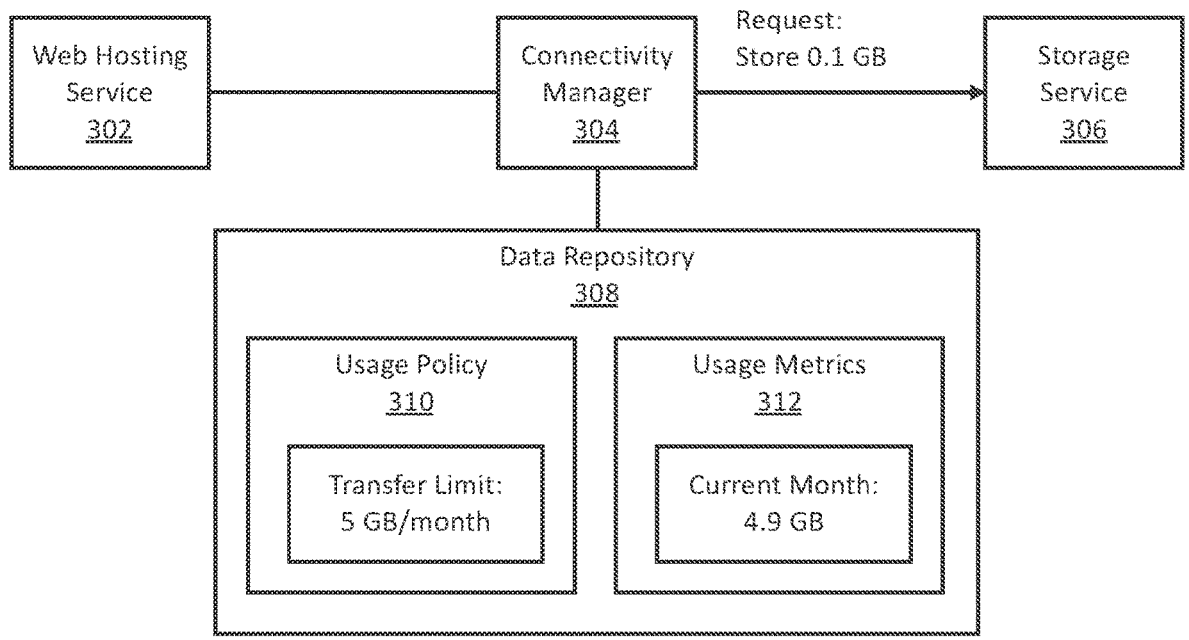

As illustrated in FIG. 3B, the connectivity manager 304 determines that the request from the web hosting service does not violate the usage policy 310. Accordingly, the connectivity manager 304 accesses the storage service 306 to store the 0.1 GB of data supplied by the web hosting service 302. In addition, the connectivity manager 304 updates the usage metrics 312 to indicate that 4.9 GB have now been transferred in the current month.

Figure 3C:
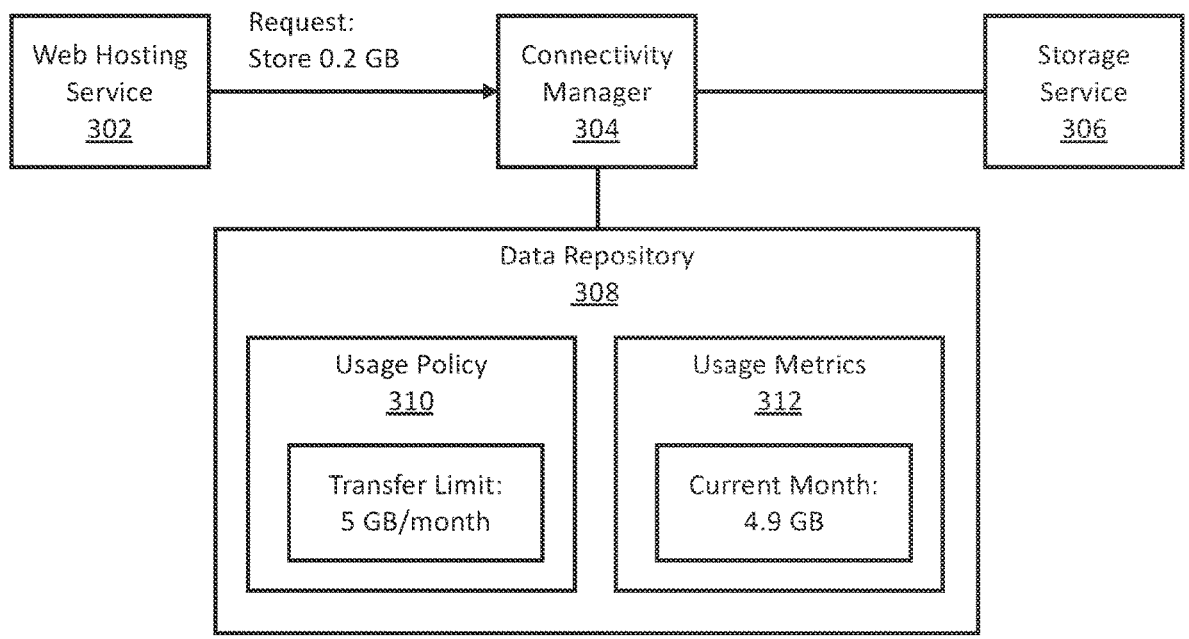
Figure 3D:
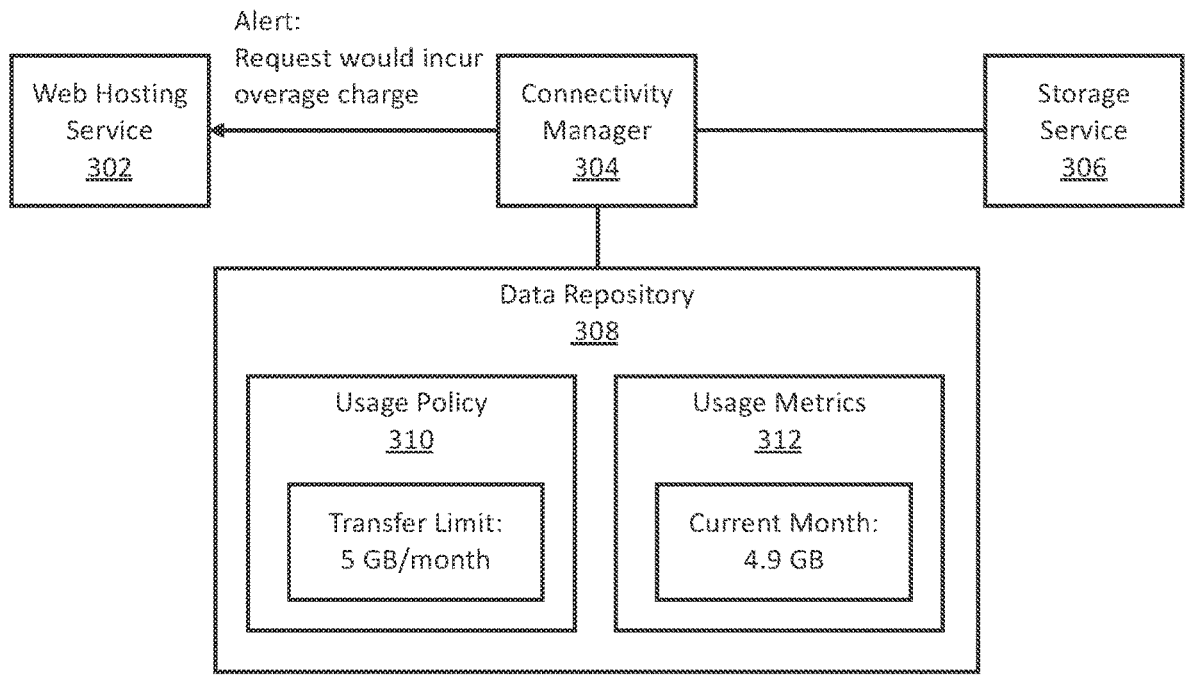

In FIG. 3C, the web hosting service 302 transmits another request to the connectivity manager 304's API, this time requesting to store another 0.2 GB of data at the storage service 306. As illustrated in FIG. 3D, the connectivity manager 304 determines that the request violates the usage policy 310. Specifically, if the request were allowed to proceed, storing another 0.2 GB of data at the storage service would exceed the 5 GB/month transfer limit. The connectivity manager 304 transmits an alert to the web hosting service 302, indicating that the request violates the usage policy 310. In addition, in this example, the alert indicates that storing the data as requested would incur an overage charge imposed by the storage service 306.

Figure 3E:
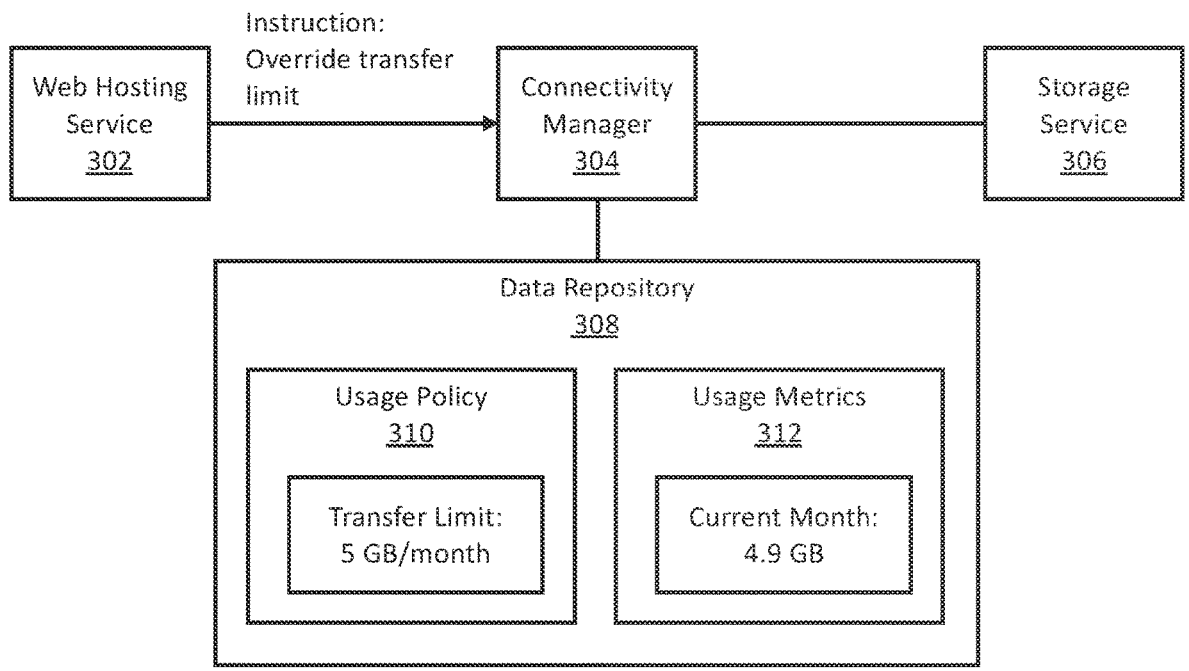
Figure 3F:
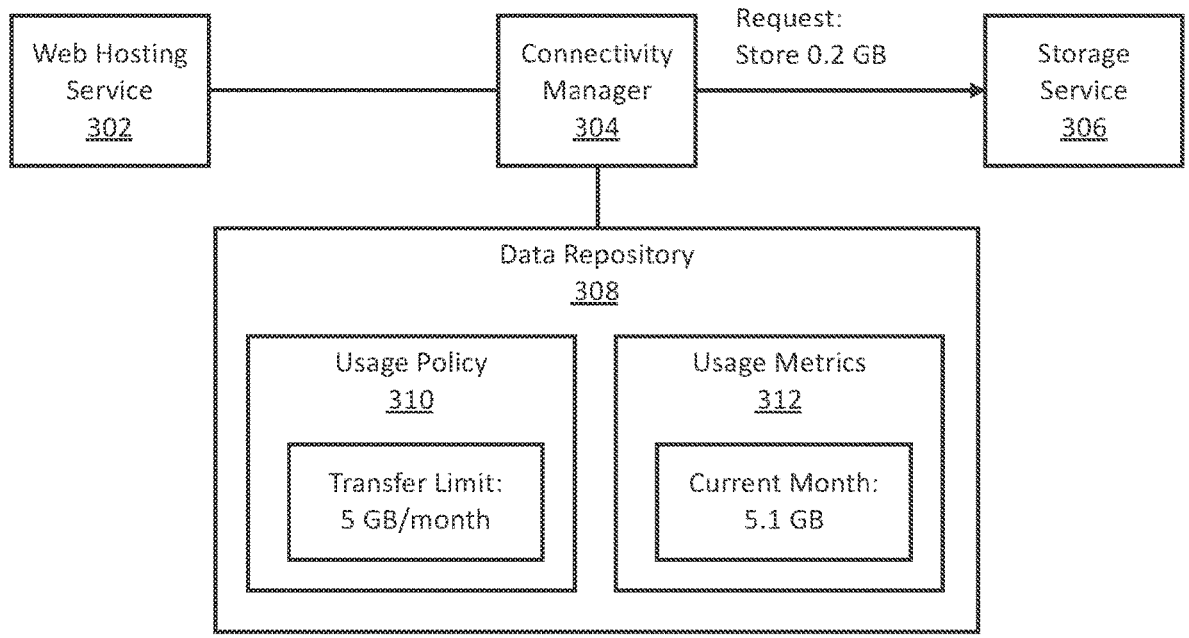

In FIG. 3E, responsive to the alert, the web hosting service 302 transmits an instruction (which may be based on user input entered in a user interface of the web hosting service) to override the usage policy 310. Specifically, the instruction indicates that the connectivity manager 304 should access the storage service 306 to store the additional 0.2 GB as requested, even though doing so exceeds the transfer limit and will incur overage charges. In FIG. 3F, based on the instruction, the connectivity manager 304 accesses the storage service 306 to store the additional 0.2 GB of data supplied by the web hosting service 302. In addition, the connectivity manager 304 updates the usage metrics 312 to indicate that 5.1 GB have now been transferred in the current month. Any subsequent request from the web hosting service 302 to store data at the storage service 306 in the same month will also violate the usage policy 310, because the transfer limit has already been exceeded. If the instruction that the connectivity manager 304 from the web hosting service 302 was for an ongoing override of the usage policy 310, the connectivity manager 304 may continue to access the storage service 306 as requested, without transmitting additional alerts to the web hosting service 302 until the override expires or otherwise does not apply.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or in addition, the computer system 400 may receive user input via a cursor control 416, such as a mouse, a trackball, a trackpad, a touchscreen, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The display 412 may be configured to receive user input via one or more pressure-sensitive sensors, multi-touch sensors, and/or gesture sensors. Alternatively or in addition, the computer system 400 may receive user input via a microphone, video camera, and/or some other kind of user input device (not shown).

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 400 can receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A non-transitory computer readable medium comprising instructions which, when executed by one or more hardware processors, cause performance of operations comprising:
   receiving, via a plug-in application recipe ("PIAR") management application, a plurality of PIAR definitions corresponding respectively to a plurality of PIARs;
   wherein the PIAR management application stores and manages the plurality of PIAR definitions;
   wherein a particular PIAR definition of the plurality of PIAR definitions, corresponding to a particular PIAR of the plurality of PIARs, identifies:
      (a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
      (b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition;
   activating, by the PIAR management application, the particular PIAR by configuring execution of the action in response to detecting the trigger on an ongoing basis;
   receiving a PIAR restriction;
   determining that the PIAR restriction prohibits execution of the particular PIAR; and
   responsive to determining that the PIAR restriction prohibits execution of the particular PIAR, deactivating the particular PIAR.

2. The media of claim 1, wherein determining that the PIAR restriction prohibits execution of the particular PIAR comprises determining that the PIAR restriction blocks one or more of using or activating the particular PIAR.

3. The media of claim 1, wherein the PIAR restriction prohibits an operation that would otherwise be executed for completing the action associated with the particular PIAR.

4. The media of claim 1, wherein deactivating the particular PIAR is performed by the PIAR management application.

5. The media of claim 1, wherein deactivating the particular PIAR is performed by a connectivity manager in communication with the PIAR management application, the connectivity manager restricting data communication to and from the first plug-in application monitored by the particular PIAR.

6. The media of claim 1, wherein:
the trigger corresponds to exceeding a threshold data transmission rate; and
the action corresponds to preventing subsequent data transmissions in response to detecting that the threshold data transmission rate has been exceeded.

7. The media of claim 1, wherein:
the trigger corresponds to a distributed denial of service network attack; and
the action corresponds to preventing subsequent data transmissions in response to identifying the distributed denial of service network attack.

8. A method comprising:
receiving, via a plug-in application recipe ("PIAR") management application, a plurality of PIAR definitions corresponding respectively to a plurality of PIARs;
wherein the PIAR management application stores and manages the plurality of PIAR definitions;
wherein a particular PIAR definition of the plurality of PIAR definitions, corresponding to a particular PIAR of the plurality of PIARs, identifies:
(a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
(b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition;
activating, by the PIAR management application, the particular PIAR by configuring execution of the action in response to detecting the trigger on an ongoing basis;
receiving a PIAR restriction;
determining that the PIAR restriction prohibits execution of the particular PIAR; and
responsive to determining that the PIAR restriction prohibits execution of the particular PIAR, deactivating the particular PIAR;
wherein the method is performed by at least one device including a hardware processor.

9. The method of claim 8, wherein determining that the PIAR restriction prohibits execution of the particular PIAR comprises determining that the PIAR restriction blocks one or more of using or activating the particular PIAR.

10. The method of claim 8, wherein the PIAR restriction prohibits an operation that would otherwise be executed for completing the action associated with the particular PIAR.

11. The method of claim 8, wherein deactivating the particular PIAR is performed by the PIAR management application.

12. The method of claim 8, wherein deactivating the particular PIAR is performed by a connectivity manager in communication with the PIAR management application, the connectivity manager restricting data communication to and from the first plug-in application monitored by the particular PIAR.

13. The method of claim 8, wherein:
the trigger corresponds to exceeding a threshold data transmission rate; and
the action corresponds to preventing subsequent data transmissions in response to detecting that the threshold data transmission rate has been exceeded.

14. The method of claim 8, wherein:
the trigger corresponds to a distributed denial of service network attack; and
the action corresponds to preventing subsequent data transmissions in response to identifying the distributed denial of service network attack.

15. A system comprising:
at least one device including a hardware processor;
the system being configured to perform operations comprising:
receiving, via a plug-in application recipe ("PIAR") management application, a plurality of PIAR definitions corresponding respectively to a plurality of PIARs;
wherein the PIAR management application stores and manages the plurality of PIAR definitions;
wherein a particular PIAR definition of the plurality of PIAR definitions, corresponding to a particular PIAR of the plurality of PIARs, identifies:
(a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
(b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition;
activating, by the PIAR management application, the particular PIAR by configuring execution of the action in response to detecting the trigger on an ongoing basis;
receiving a PIAR restriction;
determining that the PIAR restriction prohibits execution of the particular PIAR; and
responsive to determining that the PIAR restriction prohibits execution of the particular PIAR, deactivating the particular PIAR.

16. The system of claim 15, wherein determining that the PIAR restriction prohibits execution of the particular PIAR comprises determining that the PIAR restriction blocks one or more of using or activating the particular PIAR.

17. The system of claim 15, wherein the PIAR restriction prohibits an operation that would otherwise be executed for completing the action associated with the particular PIAR.

18. The system of claim 15, wherein deactivating the particular PIAR is performed by the PIAR management application.

19. The system of claim 15, wherein deactivating the particular PIAR is performed by a connectivity manager in communication with the PIAR management application, the connectivity manager restricting data communication to and from the first plug-in application monitored by the particular PIAR.

20. The system of claim 15, wherein:
- the trigger corresponds to exceeding a threshold data transmission rate; and
- the action corresponds to preventing subsequent data transmissions in response to detecting that the threshold data transmission rate has been exceeded.

* * * * *